United States Patent
Vickery et al.

(10) Patent No.: US 7,779,681 B2
(45) Date of Patent: Aug. 24, 2010

(54) SAW BASED TIRE PRESSURE SENSOR VALVE ADAPTOR

(75) Inventors: Paul Edward Vickery, Northants (GB); Paul Joseph Howse, Oxfordshire (GB)

(73) Assignee: Transense Technologies PLC (GB)

( * ) Notice: Subject to any disclaimer, the term of this patent is extended or adjusted under 35 U.S.C. 154(b) by 252 days.

(21) Appl. No.: 11/630,059

(22) PCT Filed: May 12, 2005

(86) PCT No.: PCT/GB2005/001846
§ 371 (c)(1),
(2), (4) Date: Sep. 10, 2008

(87) PCT Pub. No.: WO2005/123421
PCT Pub. Date: Dec. 29, 2005

(65) Prior Publication Data
US 2009/0007648 A1    Jan. 8, 2009

(30) Foreign Application Priority Data
Jun. 22, 2004    (GB) ................................. 0413969.7

(51) Int. Cl.
B60C 23/02    (2006.01)
(52) U.S. Cl. .................................... 73/146.8
(58) Field of Classification Search ........................ None
See application file for complete search history.

(56) References Cited

U.S. PATENT DOCUMENTS 5,853,020 A * 12/1998 Widner ........................ 137/227
6,715,355 B2 * 4/2004 Vile et al. ..................... 73/702
2002/0117005 A1 8/2002 Vile et al.
2003/0209065 A1 * 11/2003 Fonteneau ................. 73/146.8

(Continued)

FOREIGN PATENT DOCUMENTS

DE    10131168    1/2003

(Continued)

OTHER PUBLICATIONS

Search Report, UK Patent Office, Application No. GB0413969.7, Apr. 25, 2005.

(Continued)

*Primary Examiner*—Andre J Allen
(74) *Attorney, Agent, or Firm*—Keusey & Associates, P.C.

(57) ABSTRACT

A SAW based tire pressure sensor assembly comprising a body having a tubular stud 1 formed on an end thereof which is engageable in an inflation tube formed in a tire inflation valve 3 so as to fasten the body to the valve 3. A through passage extends through the stud 1 into said body and is in fluid communication with the atmosphere surrounding the assembly by means of apertures 2 in the sides of the body, thereby providing a fluid coupling between an inflation duct of the inflation valve 3 and the atmosphere surrounding the body. A SAW based pressure sensor is mounted within said body so as to be in fluid communication with the atmosphere surrounding the body, and an antenna 4 is connected to the sensor to enable remote interaction therewith. A grounding plate 5 connected to the antenna is sandwiched between the assembly and has arms which engage against the inner surface of the wheel so as to enhance the sensor antenna earth.

16 Claims, 1 Drawing Sheet

U.S. PATENT DOCUMENTS

2006/0059994 A1 * 3/2006 Cameron et al. .............. 73/700

FOREIGN PATENT DOCUMENTS

| WO | WO 01/56814 | 8/2001 |
| WO | WO 02/20287 | 3/2002 |
| WO | WO 2005/123421 | 12/2005 |

OTHER PUBLICATIONS

International Preliminary Report on Patentability, European Patent Office, Sep. 20, 2006.

International Search Report, European Patent Office, Nov. 7, 2005.

* cited by examiner though with the "Clamp In" version the stud is anchored by the valve clamping nut. In both cases, therefore, the adaptor can easily be fitted and removed from the valve without having to replace the valve as a whole.

SAW BASED TIRE PRESSURE SENSOR VALVE ADAPTOR

CROSS REFERENCE TO RELATED APPLICATIONS

This application claims the benefit of PCT Application No. PCT/GB2005/001846, filed May 12, 2005, and GB Application 0413969.7, filed Jun. 22, 2004, both of which are herein incorporated by reference.

BACKGROUND OF THE INVENTION

1. Field of the Invention

The present invention relates to SAW based tyre pressure sensors, and in particular to adaptors which enable such sensors to be retrofitted to existing tyre inflation valves.

2. Description of the Related Prior Art

Surface Acoustic Wave devices are known in the art to be useful as pressure sensors, and they have particularly application as remote or wireless pressure and temperature sensors in tyres. These SAW based pressure sensors must be placed in fluid communication with the pressurised atmosphere within the tyre, and this is typically done either by attaching the sensor to the inner wall of the tyre or integrating it into a tyre pressure valve. Applicant's own earlier Granted UK patent GB2352814 and UK patent application no. GB021163.0 disclose a particular example of a tyre inflation valve with an integrated SAW pressure sensor. However, this system requires the fitting of a new inflation valve when installing the system into an existing wheel, and also results in the SAW sensor being disposed of every time the valve is replaced, for example when a new tire is fitted onto a rim, thereby increasing costs.

SUMMARY OF THE INVENTION

According to the present invention, there is provided a SAW based tire pressure sensor assembly comprising a body having fastening means provided on an end thereof which, in use, is engageable with an inner end of a tire inflation valve so as to fasten the body thereto, a through passage extending from said fastening means through said body so as to provide, in use, a fluid coupling between an inflation duct of the inflation valve and the atmosphere surrounding the body, and a SAW based pressure sensor mounted within said body so as to be in fluid communication with the atmosphere surrounding the body.

A pressure sensor assembly in accordance with the invention has the advantage that it may be retrofitted to existing inflation valves quickly and easily, thereby avoiding the need to replace the entire valve assembly and hence reducing costs. Furthermore, when the valve needs replacement, the adaptor can be removed from the old valve and fitted onto the new one, thereby avoiding unnecessary disposal of fully working sensors.

The surface acoustic wave (SAW) devices referred to in this document are single port resonators, which are laid down as a group of three on to a single substrate mono-crystalline quartz die housed within a metal package. The package incorporates a diaphragm which, under the action of external pressure, presses on to the centre of the die causing it to bend. The resonant frequencies of the SAW resonators change with mechanical strain and temperature and by suitable interrogation and processing, independent pressure and temperature signals are obtained. The packaged sensor is interrogated by an RF signal and responds with a back-scattered RF signal in both cases via a local antenna The fastening means is preferably formed so as to enable easy interfacing with existing valves without requiring excessive modification of the valve. In one embodiment, suitable for use with snap-in type inflation valves, the fastening means may be formed as a tube which pushes into the bulb end of the valve which, in use, is located within the pressurised chamber of the tire. In particular, the tube may include circumferentially extending ridges or barbs to facilitate its insertion into but inhibit its removal from the inflation duct.

In another embodiment, the fastening means takes the form of a threaded tube, which may be parallel or tapered and which is engageable with a complementary female or male thread formed on the inner end of the inflation valve. In this arrangement, the inflation valve may require modification to accept the threaded tube by cutting a suitable thread thereon, or the threaded tube may be self tapping.

Instead of or in addition to the fastening means mentioned above, a suitable adhesive may be used to fasten the fastening means to the inflation valve.

In a further development of the invention, an antenna may be provided on the body which is connected to the SAW sensor for remote interface therewith. A grounding plate may also then be provided on the body which, in use, engages with the inner surface of the wheel so as to enhance the sensor antenna earth, either by a capacitive contact if the wheel is coated by a non-conductive material, e.g. paint, lacquer or anodising, or by a direct DC coupling if no such coating is present. In a particularly advantageous development, the grounding plate is formed as a leaf spring or spring loaded plate which is clamped between the assembly and the inflation valve and which has arms which are biased so as, in use, to bend away from the adaptor and hence firmly press against the inner surface of the wheel.

In order that the invention may be well understood, there will now be described some embodiments thereof, given by way of example, reference being made to the accompanying drawings, in which:

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
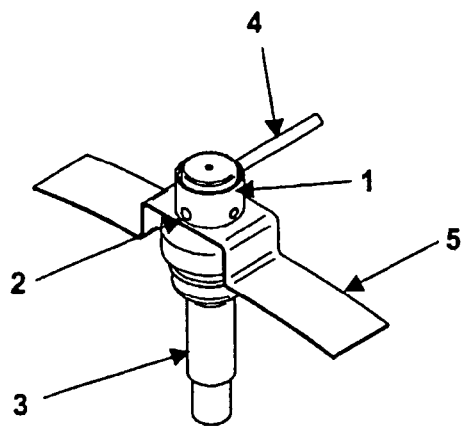
FIG. 1 is a perspective view of an assembly according to a first embodiment of the invention mounted onto a tire inflation valve.

Referring to the drawings, there are shown two embodiments of a tire pressure monitoring assembly suitable for converting standard "Snap In" 3 and "Clamp In" 6 tire valves into SAW based tire pressure monitoring sensors by retrofitting. In each embodiment, the adaptor incorporates an enhancement to the earth of the sensor to the wheel via a capacitive/direct spring loaded contact 5.

Figure 2:
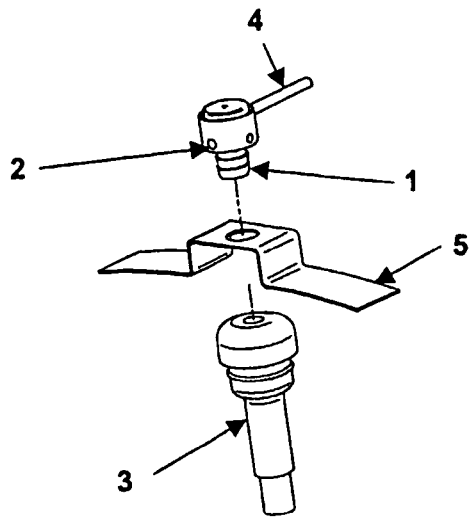
FIG. 2 is an exploded perspective view of the adaptor of FIG. 1.

With reference to FIGS. 1 and 2, the "Snap In" adaptor is a push fit into the rubber valve 3 secured by a barbed stud 1. A proprietary adhesive may also be used to increase the security of the fixing. The adaptor incorporates a through hole in its end which connects to side air holes 2 so as to allow air flow into and out of the tire. In this way, the adaptor does not interfere with the functionality of the valve. An antenna 4 is also provided on the adaptor for remote signal coupling as is well known in the art.

Figure 3:
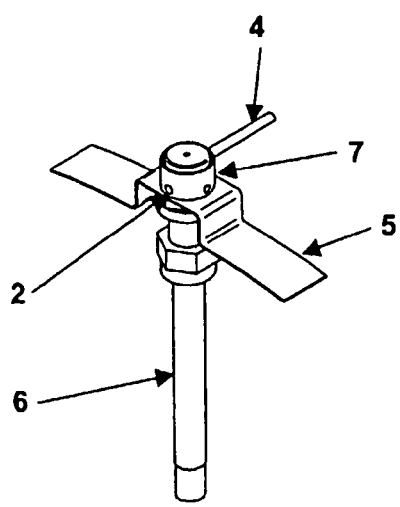
FIG. 3 is a perspective view of an assembly according to a second embodiment of the invention mounted onto a tire inflation valve.
Figure 4:
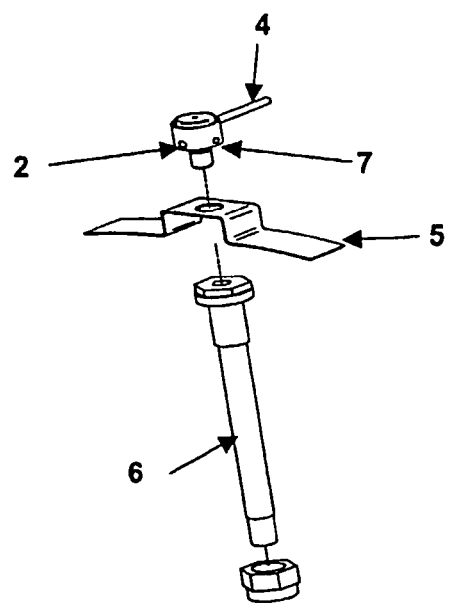
FIG. 4 is an exploded perspective view of the adaptor of FIG. 3.

FIGS. 3 and 4 show a "Clamp In" adaptor which is similar to the "Snap In" adaptor with the exception that it has a threaded stud 7. This necessitates that the "Clamp In" valve 6 be modified to accept the threaded stud 7. The threaded tube 7 may be self tapping. The self tapping threads are configured to cut a complementary thread at the mating end of the inflation valve as the sensor housing is screwed in to the valve. A proprietary adhesive may also be used to increase the security of the fixing. Again, an antenna 4 is provided for remote signal coupling to the SAW sensor.

As inflation valves typically have a rubber seal/interface with the wheel there is a need to enhance the sensor antenna earth. This is achieved in each embodiment by means of a spring loaded shim 5 sandwiched between the adaptor and the valve. The earth contact 5 is pressed against the inside surface of the wheel due to the spring loading of its leaf arms and thereby achieves a capacitive contact if the wheel is coated with a non-conductive material or a direct dc contact if no such coating is present.

The invention claimed is:

1. A sensor housing for mounting on an inflation valve of a tire having an inflation duct, comprising:
   a sensor housing having (i) a tube with a fastening end adapted to fasten the housing onto the inflation valve, and (ii) a through passage extending from the fastening end through said sensor housing, the through passage capable of providing a fluid coupling between the inflation duct and the atmosphere surrounding said housing;
   a surface acoustic wave (SAW) based pressure sensor mounted within said sensor housing, wherein the SAW based pressure sensor is in fluid communication with the atmosphere surrounding said housing; and
   a fastening element with threads formed on said fastening end, adapted to engage an inner surface of said inflation duct, wherein the threads are self tapping and are configured to cut a complementary thread at the mating end of the inflation valve as the sensor housing is screwed in to the valve.

2. The sensor housing according to claim 1, wherein the sensor housing further comprises an antenna connected to the SAW sensor and is configured to enable remote interfacing with a sensor.

3. The sensor housing according to claim 2, further comprising a grounding plate disposed on the sensor housing, configured to engage an inner surface of a wheel on which the tire is mounted, and configured to enhance the antenna earth.

4. The sensor housing according to claim 3, wherein the ground plate is clamped between the housing and the inflation valve, the grounding plate further comprising:
   at least one arm extending laterally from the housing and which is biased towards the inflation valve and is configured to press firmly against the inner surface of the wheel.

5. The sensor housing according to claim 4, wherein the grounding plate is a leaf spring.

6. The sensor housing according to claim 4, wherein the grounding plate is a spring loaded plate.

7. The sensor housing according to claim 3, wherein the grounding plate further comprises a central opening configured to accept the fastening element and configured to locate the grounding plate between the sensor housing and the inflation valve.

8. The sensor housing according to claim 1, wherein the sensor housing further comprises a plurality of apertures in fluid communication with the through passage.

9. A sensor housing for mounting on an inflation valve of a tire having an inflation duct, comprising:
   a sensor housing, having (i) a tube having a fastening end adapted to fasten the housing onto said inflation valve, and (ii) a through passage extending from the fastening end through said sensor housing, the through passage capable of providing a fluid coupling between the inflation duct and the atmosphere surrounding said housing;
   a surface acoustic wave (SAW) based pressure sensor mounted within the sensor housing, wherein the SAW based pressure sensor is in fluid communication with the atmosphere surrounding the sensor housing;
   a fastening element formed on said fastening end, adapted to engage an inner surface of said inflation duct, the fastening element comprising at least one circumferentially extending ridge;
   an antenna connected to the SAW sensor and is configured to enable remote interfacing with a sensor; and
   a grounding plate disposed on the sensor housing, configured to engage an inner surface of a wheel on which the tire is mounted, and configured to enhance antenna earth.

10. The sensor housing according to claim 9, wherein the at least one circumferentially extending ridges are one of barbs or threads.

11. The sensor housing according to claim 10, wherein the fastening element is configured to achieve a push fit into the inflation duct at a bulb end of the inflation valve.

12. The sensor housing according to claim 9, wherein the at least one circumferentially extending ridge comprises threads that are self tapping and configured to cut a complementary thread at the mating end of the inflation valve as the sensor housing is screwed in to the valve.

13. The sensor housing according to claim 9, wherein the grounding plate comprising a central opening configured to accept the fastening element and configured to locate the grounding plate between the sensor housing and the inflation valve.

14. The sensor housing according to claim 9, wherein the ground plate is clamped between the housing and the inflation valve, the grounding plate further comprising: at least one arm extending laterally from the sensor housing and which is biased towards the inflation valve and is configured to press firmly against the inner surface of the wheel.

15. The sensor housing according to claim 14, wherein the grounding plate is a leaf spring.

16. The sensor housing according to claim 14, wherein the grounding plate is a spring loaded plate.

* * * * *